United States Patent [19]

Inoue et al.

[11] Patent Number: 4,942,185

[45] Date of Patent: Jul. 17, 1990

[54] WATER BASE PIGMENT INK COMPOSITIONS FOR USE IN MARKING PENS

[75] Inventors: Hiroshi Inoue; Wataru Yokono; Yasuji Okuda, all of Osaka, Japan

[73] Assignee: Sakura Color Products Corp., Higashinari, Japan

[21] Appl. No.: 434,945

[22] Filed: Nov. 9, 1989

[30] Foreign Application Priority Data

Nov. 15, 1988 [JP] Japan ................................ 63-288237

[51] Int. Cl.$^5$ ................................................ C08J 9/32
[52] U.S. Cl. ........................................ 521/54; 521/55; 521/134; 521/139; 524/413; 524/432; 524/522
[58] Field of Search .................... 521/54, 55, 134, 139; 524/413, 432, 522

[56] References Cited

U.S. PATENT DOCUMENTS

| | | | |
|---|---|---|---|
| 4,699,810 | 10/1987 | Blakeman et al. | 521/54 |
| 4,771,079 | 9/1988 | Melber | 521/54 |
| 4,843,104 | 6/1989 | Melber et al. | 521/54 |
| 4,861,804 | 8/1989 | Nakanishi | 521/54 |

*Primary Examiner*—Morton Foelak
*Attorney, Agent, or Firm*—Howard C. Miskin

[57] ABSTRACT

A water base pigment ink composition for use in marking pens which contain an absorbent ink reservoir and a pen tip connected thereto, the ink composition comprising:

(a) water in amounts of not less than 50% by weight;
(b) an aqueous emulsion of hollow resin particles in amounts of 0.5–40% by weight as solids;
(c) a white pigment in amounts of 1–40% by weight; and
(d) a water-solubilized α-methylstyrene/styrene/acrylic acid copolymer which has a weight average molecular weight of 1000–10,000 and a distribution of molecular weight of 0.5–3.3, but which contains substantially no components having a weight average molecular weight of not more than 500, in amounts of 0.1–30% by weight, based on the ink compositions, respectively.

The ink composition may contain chromatic or achromatic (other than white) pigments in amounts of 0.1–30% by weight based on the ink composition.

7 Claims, No Drawings

WATER BASE PIGMENT INK COMPOSITIONS FOR USE IN MARKING PENS

This invention relates to a water base pigment ink composition for use in marking pens which contain an absorbent ink reservoir and a pen tip connected thereto. The invention further relates to such a marking pen which employs the ink composition.

Heretofore, water base ink compositions employing pigments therein as colorants for use in writing instruments contain white pigments of large particle size and large specific gravity exemplified by titanium dioxide to provide writings formed therewith with sufficient hiding power or opacity.

These prior ink compositions, however, can not be used for marking pens which contain an absorbent ink reservoir and a pen tip connected thereto, since the white pigments are poorly dispersible in ink compositions, and are deposited in the ink reservoir.

Such marking pens are well known in the art. For instance, the absorbent ink reservoir is a microporous absorbent body composed of fibrous or felt-like material or any other suitable absorbent material and likewise a microporous a pen tip connected thereto to which inks are supplied by the ink reservoir through capillarity of the microporous networks. Pen tips are also known which are composed of molded resins, as they are called plastic pens.

White pigments of smaller particle size may be better in dispersibility in ink compositions, but the compositions are inferior in hiding power so that writings formed therewidth are of insufficient opacity.

Thus, water base white ink compositions have been proposed which employ hollow resin particles called plastic pigments together with titanium dioxide oor chromatic pigments, for example, in Japanese Patent Laid-open No. 63-145380 and No. 63-145382. Further, water base black ink compositions have been proposed which employ the hollow resin particles and carbon black.

It is true that the hollow resin particles are good in dispersibility, but are in general inferior in hiding power to, for example, titanium dioxide. When the hollow resin particles are used in combination with titanium dioxide in ink compositions to increase their hiding power, the titanium dioxide deposits in the compositions, to form writings uneven in darkness, and accordingly such ink compositions may not be used for such marking pens as described hereinbefore.

The present inventors have made intensive investigations to obviate the above described problems in the prior water base pigment ink compositions for use in marking pens which employ an absorbent ink reservoir and a pen tip conneted thereto, and found that the use of a specific water-solublized resin as a dispersant for hollow resin particles and pigments prevents the deposition of pigments and thus provides ink compositions which have high hiding power and are suitably used for the marking pens.

Therefore, it is an object of the invention to provide a water base ink composition containing pigments as colorants for use in marking pens which employ an absorbent ink reservoir and a pen tip connected thereto.

It is a further object of the invention to provide a marking pen which employ an absorbent ink reservoir and a pen tip connected thereto wherein a water base ink composition is used.

There is provided in accordance with the invention a water base pigment ink composition for use in marking pens which contain an absorbent ink reservoir and a pen tip connected threto, the ink composition comprising:
(a) water in amounts of not less than 50% by weight;
(b) an aqueous emulsion of hollow resin particles in amounts of 0.5–40% by weight as solids;
(c) a white pigment in amounts of 1–40% by weight;
(d) a water-solubilized α-methylstyrene/styrene/acrylic acid copolymer which has a weight average molecular weight of 1000–10,000 and a distribution of molecular weight of 0.5–3.3, but which contains substantially no components having a weight average molecular weight of not more than 500, in amounts of 0.1–30% by weight, based on the ink compositions, respectively.

The ink composition of the invention contains water as solvents in amounts of not less than 50% by weight, preferably in amounts of not less than 60% by weight, based on the composition.

The ink composition contains therein hollow resin particles as a hiding agent. The hollow resin particles are already known as plastic pigments, and are usually obtained by emulsion (co)polymerization of one or more of styrene, acrylic acid, acrylic ester, methyl methacrylate or vinyl chloride. Thus, the hollow resin particles are available as aqueous emulsions of (co)polymers such as polystyrenes, acrylic/styrene copolymers, polymethyl methacrylates or polyvinyl chlorides. The hollow resin particles usually have a specific gravity of not more than one, a particle size of about 0.1–1.0 μm and a refractive index of 1.4–1.6. Aqueous emulsions of such hollow resin particles are available, for example, as Voncoat (acrylic/styrene copolymers) or Grandol by Dainippon Ink Kagaku Kogyo K.K., Opaque Polymer (acrylic/styrene copolymers) by Rohm & Hass Japan K.K., or Latex SBL 8801 (polystyrene) by Asahi Kasei Kogyo K.K.

The hollow resin particles are contained in amounts of 0.5–40% by weight, preferably of 1–20% by weight, as solids, based on the ink compositions. When the amount of the hollow resin particles is less than 0.5% by weight based on the ink composition, the resulting ink compositions are insufficient in hiding power, whereas when the amount of the hollow resin particles is more than 40% by weight based on the ink composition, the resulting ink compositions are poor in adhesion of writings formed onto writing surfaces, but also they are apt to clogg pen tips.

The use of white pigments such as titanium dioxide or zinc oxide, the former being preferred, together with the hollow resin particles provides white and opaque ink compositions. The white pigments are emloyed in amounts of 1–40% by weight, preferably of 1–30% by weight, based on the ink composition. The employment of the white pigments in excess makes the resultant ink compositions too viscous so that the compostions write bad, but also they are inferior in storage stability.

The use of black or otherwise achromatic (other than white) pigments provides achromatic (other than white) ink compositions. the pigments used are not specifically limited, and include, for example, carbon black, azo, phthalocyanine, quinacuridone, anthraquinone, dioxazine, indigo, perynone, perylene, isoindrenone or azomethinazo pigments.

A variety of aqueous pigment dispersions are commercially available, and they may be preferably used in the invention. The dispersion usually contains a dispersant and/or a surfactant, so that the ink composition of the invention may contain such a dispersant and/or a surfactant when the dispersion is used in the ink composition.

Chromatic or achromatic (other than white) pigments are contained, when necessary, in amounts of 0.1–30% by weight, preferably in amounts of 1–15% by weight, based on the ink composition. The use of such pigments in excess is not desired since the resultant ink compositions are too viscous and write bad.

The ink composition of the invention contain a water-solubilized α-methylstyrene/styrene/acrylic acid copolymer which has a weight average molecular weight of 1000–10,000 and a distribution of molecular weight of 0.5–3.3, but which contains substantially no components having a weight average molecular weight of not more than 500 wherein the distribution of molecular weight is defined as ratios of weight average molecular weights (Mw)/number average molecular weights (Mn), in amounts of 0.1–30% by weight, based on the ink compositions. The copolymer is effective as a dispersant for the pigments as well as a leveling agent for writings on writing surfaces.

The water-solubilized α-methylstyrene/styrene/acrylic acid copolymer used in the invention is available as Joncryl® 555, 586, 678, 680, 682 or 683 of Johnson Polymer K.K which are ammonium salt of the coplymers and thus are made water-soluble. However, water-solubilized α-methylstyrene/styrene/acrylic acid copolymer by salt formation with alkali metals such as sodium or potassium or organic amine may also be used.

It is an essential feature of the invention to use the water-solubilized α-methylstyrene/styrene/acrylic acid copolymer as a dispersant for the hollow resin particles and the pigments, and the copolymer prevents the deposition of the pigments when being used in marking pens which employ an absorbent ink reservoir and a pen tip connected thereto.

It is confirmed that no deposition of the pigments takes place in the ink composition in accordance with the invention by the fact that there are formed writings of the same darkness as the initial after standing the marking pens upright with the pen tip downwards or upside down with the pen tip upwards. In this way, no deposition of pigments takes place when the ink composition of the invention is used in marking pens, although the pigments used deposit when the ink composition is left standing in a vessel.

Although the reasons therefor are not yet clarified, and the invention is not limited to any theory, but it is likely that the ink composition of the invention has a thixotropic structure in the microporous ink reservoir on account of the water-solubilized resin so that the pigments are distributed uniformly throughout the reservoir without being localized, irrespectively of possible deposition of pigments within the individual microporous meshes of the ink reservoir, whereas when a stress is applied to the ink compositions to form writings, the thixitropic structure of the ink composition is destroyed and the ink compositions flow smoothly within the microporous ink reservoir to the pen tip connected thereto.

It is to be noted that when these pigments only are dispersed in ink compositions without the hollow resin particles by use of the water-solubilized copolymer, the pigments deposit in the ink reservoir. Further, when the hollow resin particles only are dispersed in ink compositions without the pigments by use of the water-solubilized copolymer, the hollow resin particles deposit in the ink reservoir. Therefore, it is essential to employ both hollow particles resins and pigments in combination with the water-solubilized copolymer so that neither the pigments nor the hollow resin particles deposit in the ink reservoir, thereby to provide ink compositions of the invention which writes well and the writings formed therewith have sastisfactory hiding power without change in darkness even when writing is continued.

The ink composition of the invention may further contain other dispersants such as water soluble resins. The water soluble resins used include, for example, synthetic resins such as polyvinyl pyrrolidone or polyvinyl alcohol, or natural water soluble resins such as shellac or gum arabic. In addition, water-solublized resins by salt formation with ammonium bases or alkali matal bases, such as water-solublized acrylic resins or styrene/maleic anhydride copolymer resins may also be contained in the ink composition. The water soluble or water-solublized resins are contained in amounts of not more than 30% by weight, preferably in amounts of not more than 20% by weight, based on the ink composition. The employment of the resins in excess amounts causes reduction of hiding power of the hollow resin particles and the pigments used in the ink composition.

It is necessary, as generally accepted in the art, that ink compositions for use in writing instruments which employ such ink reservoirs as described hereinbefore have a viscosity of not more than 10 centipoises at room temperatures so that the ink compositions have a satisfactory fluidity through the reservoirs to pen points and write well. However, in accordance with the invention, it is enought that the ink composition has a visocity of not more than 30 centipoises at room temperatures to write well.

The ink composition of the invention may contain water soluble organic solvents as wetting agents and/or drying assistants. Such water soluble organic solvents usable include, for example, lower aliphatic alcohols such as ethanol, isopropanol or butanol, polyhydric alcohols, alkylene glycols or polyalkylene glycols such as glycerine, ethylene glycol, diethylene glycol, triethylene glycol, propylene glycol, dipropylene glycol, tripropylene glycol, polyethylene glycol or polyproylene glycol. These organic solvents may be contained in amounts of not more than 20% by weight, preferably in amounts of not more than 10% by weight, based on the ink composition.

A variety of surfactants, either anionic, nonionic, cationic or ampholytic, may also be incorporated in the ink composition to improve leveling properties of writings formed on impervious writing surfaces. However, among the surfactants are preferred polyoxyethylene carboxylic acid, sulfonica acid, sulfate or phosphate nonionic or anionic surfactants, ampholytic betaine surfactants or fluorinated surfactants. The amount of surfactants may be not more than 10% by weight, preferably not more. than 5% by weight, based on the ink composition. The use of surfactants is exess amounts adversely affects the dispersibility of the resultant ink compositions.

The ink composition may further contain any conventional additives used in water base ink compositions, such as pH controllers, anticorrosion agents or dispersion assistants in effective amounts.

The marking pen of the invention comprises an absorbent ink reservoir impregnated with such an ink compòsition as described hereinbefore and a pen tip connected thereto, and the ink composition is distributed substantially uniformly throughout the ink reservoir, so that the marking pen writes well even after a long period of storage.

The invention will now be described with reference to examples, however, which are not to be construed as limiting to the invention.

Weight average molecular weight (Mw), number average molecular weight (Mn) and distribution of molecular weight of the water-solublized α-methylstyrene/styrene/acrylic acid copolymer in the form of ammonium salts used in the examples are shown in the Table 1.

TABLE 1

| Resin | Mw | Mn | Mw/Mn |
|-------|------|------|-------|
| A | 6500 | 3400 | 1.9 |
| B | 3100 | 2700 | 1.2 |
| C | 8100 | 2600 | 3.1 |
| D | 3900 | 3100 | 1.3 |
| E | 1600 | 1000 | 1.5 |
| F | 7300 | 4900 | 1.5 |
| G | 20000 | 4800 | 4.2 |
| H | 10300 | 4100 | 2.5 |
| I | 6800 | 4500 | 1.5 |
| J | 17600 | 4100 | 4.3 |

In the Table 1, the resins used are water-solubilized by forming amminuim salts, and contain 34% by weight of resins and 10% by weight of isopropanol. The resins A to F are follows. A: Joncryl 555; B: Joncryl 586; C: Joncryl 678; D: Joncryl 680; E: Joncryl 682; F: Joncryl 683, all by Johnson Polymer K.K., and neither resins contain components having a molecular weight of not more than 500. The other resins are as follows. G: H-2190 by Seiko Kagaku Kogyo K.K; H: Joncryl 67 by Johnson Polymer K.K.; I: B-36 by Johnson Polymer K.K.; Hiros X-1 by Seiko Kagaku Kogyo K.K.

Then water base pigment ink compositions were prepared of which compositions are shown in the Table 2. Marking pens provided with absorbent ink reservoirs composed of polyester fibers bonded together to form microporous networks ad likewise microporous pen tips connected thereto were charged with the ink compositions, and writings are formed therewith on paper to evaluate writability. Writings were also provided on paper which had black lines printed thereon to evaluate hiding properties of the writings.

After writing as above, the marking pens were left upright with the pen tips downward or upside down with the pen tips upwards at temperatures of 50° C. for a period of one month, and writings were again formed therewith to evaluate writability and change in darkness of the writings compared with the initial writings. The results are shown in the Table 2.

TABLE 2

| | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Ink Compositions (parts by wt.) | | | | | | | | | | | | |
| Hollow resin particles | 60 | 70 | 80 | 10 | 65 | 65 | 70 | 70 | 80 | 70 | 70 | 70 |
| Titanium dioxide | 20 | 10 | 5 | 1 | 7 | 7 | 5 | 7 | | 7 | 7 | 7 |
| Black pigment (C. I. Pig. Black 7) | | | | 8 | | | | | | | | |
| Red pigment (C. I. Pig. Red 57) | | | | | 6 | | | | | 6 | | |
| Blue pigment (C. I. Pig. Blue 15) | | | | | | 6 | | | | | | 6 |
| Resin | | | | | | | | | | | | |
| A | 8 | | | | | | | | | | | |
| B | | 10 | | | | | | | | | | |
| C | | | 7 | | | | | | | | | |
| D | | | | 13 | | | | | | | | |
| E | | | | | 18 | | | | | | | |
| F | | | | | | 10 | 8 | 8 | | | | |
| G | | | | | | | 2 | | 5 | | | |
| H | | | | | | | | | | 5 | | |
| I | | | | | | | | 1 | | | 10 | |
| J | | | | | | | | 1 | | | | 5 |
| Surfactants | 1 | 1 | 1 | 1 | 1 | 1 | 1 | 1 | 1 | 1 | 1 | 1 |
| Propylene glycol | 3 | 3 | 3 | 3 | 3 | 3 | 3 | 3 | 3 | 3 | 3 | 3 |
| Water | 8 | 6 | 4 | 64 | 0 | 8 | 11 | 9 | 11 | 14 | 3 | 8 |
| Total | 100 | 100 | 100 | 100 | 100 | 100 | 100 | 100 | 100 | 100 | 100 | 100 |
| Properties of Ink Compositions | | | | | | | | | | | | |
| Viscosity (cps., at 25° C.) | 18.5 | 14.3 | 8.2 | 4.8 | 16.3 | 13.7 | 10.6 | 14.1 | 11.5 | 17.5 | 8.7 | 15.9 |
| Writability[2] | B | B | A | A | B | B | B | B | C | D | B | D |
| Hiding[3] | A | A | B | A | B | B | B | B | D | B | B | B |
| Storage (one month at 50° C.)[4] | B | B | A | A | A | A | A | A | C | D | D | D |
| Change in Darkness of Writings[2] | B | B | A | A | B | B | B | B | D | D | D | D |

Notes:
[1]Grandol P 1100 by Dainippon Ink Kagaku Kogyo K. K., containing 36% by weight of solid.
[2]Hand-written on paper. A: excellent; B: good; C: no good, writings are apt to become blurred; D: writings become blurred.
[3]Hand-written on black lines printed on paper. A: lines are invisible; B: lines are almost invisible; C: lines are clearly visible; D: no color is visible on the lines.
[4]Change in darkness were compared of writings before and after the storage. A: no change; B: almost no change: C: change is clearly seen; D: change is remarkable.

The ink composition of the Comparative Example 1 contained therein a water-solubilzed α-methylsytrene/styrene/acrylic acid copolymer, but the copolymer had no weight average molecular-weight and molecular weight distribution as defined in accordance with the invention, so that change in darknes of writings was observed between the initial and one month standing writings. The ink composition of the Comparative Examples 2-4 contained water-solubilzed resins other than those specified in the invention, and change in darkness of writings was observed between the initial and one month standing writings, as well as the ink compositions wrote bad.

On the contrary to these ink compositons, the ink compositions of the invention provided writings which showed no change in darkness after standing the marking pens for one month, but also they are superior in writability and hiding properties.

What is claimed is:

1. A water base pigment ink composition for use in marking pens which contain an absorbent ink reservoir and a pen tip connected thereto, the ink composition comprising:
   (a) water in amounts of not less than 50% by weight;
   (b) an aqueous emulsion of hollow resin particles in amounts of 0.5–40% by weight as solids;
   (c) a white pigment in amounts of 1–40% by weight; and
   (d) a water-solubilized α-methylstyrene/styrene/acrylic acid copolymer which has a weight average molecular weight of 1000–10,000 and a distribution of molecular weight of 0.5–3.3, but which contains substantially no components having a weight average molecular weight of not more than 500, in amounts of 0.1–30% by weight, based on the ink compositions, respectively.

2. A water base pigment ink composition as claimed in claim 1, wherein the hollow resin particles has a specific gravity of not more than one, a particle size of 0.1–1.0 μm and a refractive index of 1.4–1.6.

3. A water base pigment ink composition as claimed in claim 1, wherein the white pigment is titanium dioxide or zinc oxide.

4. A water base pigment ink composition as claimed in claim 1, which further contains chromatic or achromatic (other than white) pigments in amounts of 0.1–30% by weight based on the ink composition.

5. A water base pigment ink composition as claimed in claim 1, which further cntains water soluble resins.

6. A water base pigment ink composition as claimed in claim 1, which further contains water soluble organic solvents.

7. A water base pigment ink composition as claimed in claim 1, which further contains surfactants.

* * * * *